June 2, 1970 R. E. NATHER 3,515,861

DATA REDUCTION SYSTEM FOR RADIATION COUNTING EQUIPMENT

Filed Oct. 10, 1966 7 Sheets-Sheet 1

COMPUTE CONFIGURATION STEP I

INVENTOR.
ROY E. NATHER

BY T E Kinstenson

ATTORNEY

DATA REDUCTION SYSTEM FOR RADIATION COUNTING EQUIPMENT
Filed Oct. 10, 1966 7 Sheets-Sheet 2

CONTROL SYSTEM

COMPUTE CONFIGURATION - STEP 6

INVENTOR.
ROY E. NATHER
BY T E Kristjanson
ATTORNEY

June 2, 1970 R. E. NATHER 3,515,861

DATA REDUCTION SYSTEM FOR RADIATION COUNTING EQUIPMENT

Filed Oct. 10, 1966 7 Sheets-Sheet 3

INVENTOR.
ROY E. NATHER

BY T E Kristofferson

ATTORNEY

DATA REDUCTION SYSTEM FOR RADIATION COUNTING EQUIPMENT

Filed Oct. 10, 1966 7 Sheets-Sheet 4

INVENTOR.
ROY E. NATHER

BY T E Kristofferson

ATTORNEY

DATA REDUCTION SYSTEM FOR RADIATION COUNTING EQUIPMENT

INVENTOR.
ROY E. NATHER

BY T E Kristofferson

ATTORNEY

INVENTOR.
ROY E. NATHER

BY T E Kristofferson

ATTORNEY

INVENTOR.
ROY E. NATHER
BY T E Kristofferson
ATTORNEY

United States Patent Office 3,515,861
Patented June 2, 1970

3,515,861

DATA REDUCTION SYSTEM FOR RADIATION COUNTING EQUIPMENT

Roy E. Nather, Solana Beach, Calif., assignor to Beckman Instruments, Inc., a corporation of California Filed Oct. 10, 1966, Ser. No. 585,333
Int. Cl. G06f 7/38
U.S. Cl. 235—159 9 Claims

ABSTRACT OF THE DISCLOSURE

Apparatus is disclosed for performing addition, subtraction and division in which a first coded decimal register having a plurality of decades and carry lines between decades is aligned by an entry point selector with a second coded decimal register having a plurality of decades and carry lines between decades so that the contents of the second register can be added to the first register as aligned without destroying the contents of the second register. A metered pulse source is connected to the second register and ten pulses sequentially metered into each decade of the second register with carry lines of the second register disconnected. A zero detector is connected in turn to each decade of the second register and when the contents of the decade pass through zero in response to the metered pulses, the corresponding aligned first register decade is also connected to the source of metered pulses to receive the remaining ones of the ten pulses thereby completing the addition of the contents of the second register to the first register as aligned. Complementing circuitry is connected to the first register to perform subtraction by the same apparatus. To perform division an overflow detector is connected to the first register to indicate when the complemented first register plus the pulses metered thereto exceed the registery capacity and to further advance the entry point selector to establish a new decade alignment between the registers. Control and recording apparatus is connected to the registers to indicate the number of times the second register can be subtracted from the first register without overflow for each decade alignment. The total number thus determined is the quotient.

This invention relates to an improved data reduction system for radiation counting equipment and, more particularly, to such a system in which the need for auxiliary data registers for performing a divide operation is eliminated.

Prior art radiation detecting equipment, such as disclosed in U.S. patent application Ser. No. 540,609—R. E. Nather and H. W. Georgi, filed Apr. 6, 1966, entitled "Radiation Detection System with Automatic Sample Counting Rate Determination" and assigned to the assignee of the present invention, incorporates some method for reduction of accumulated data since the detecting and measuring equipment itself is often similar to the equipment used in digital computers to perform calculations. The most common form of data reduction desired consists of a divide operation, such as disclosed in the above referenced copending application, which results in the presentation of counts-per-minute (c.p.m.) as a final output rather than the separate numbers representing total counts or radiation events and total minutes of accumulated or elapsed time.

The divide process, however, is often a complicated one in digital computers. In fact, inexpensive computers often omit this operation entirely, requiring all divide operations to be performed by a program stored in the computer. In radiation counting equipment provision for c.p.m. output such as disclosed in the above referenced application requires one or more electronic or electromechanical registers in addition to those used to accumulate the data. These registers are necessary to hold intermediate results during the calculation. The system of the referenced application required three such auxiliary registers.

Apparatus is disclosed for performing addition, subtraction, and division by successive subtractions and shifting, such division performing a desired counts-per-minute calculation without employing any such auxiliary data registers, which division requires a minimum of control electronics including only three simple counters and associated timing and gating circuits to perform the entire division operation, only one of which counters is required for addition or subtraction.

These and other objects are achieved by providing an improved computer for performing addition in a coded decimal system having first and second coded decimal registers which have a plurality of decades and carry lines, the contents of which are to be added as aligned, characterized by means for disconnecting the carry lines of the second register, means for metering ten pulses into each decade of the second register, a zero detector for detecting when each of the decades of the second register passes through zero and means for metering the remainder of the ten pulses after each decade in the second register passes through zero into the decade of the first register aligned therewith.

In another form of the invention adapted for subtraction, additional complementing means are provided for complementing the first register prior to addition.

Yet another form adapted for division includes, in addition to the foregoing, an overflow detector connected to the highest order decade of the first register to detect "unsuccessful" subtractions, an output register, means for shifting the alignment of the second register to align its low order decade under a decade of the first register a given number of decades lower than previously, and control means connected to the overflow detector and the output counter to add a "one" in the output counter and recycle the means for metering when the overflow detector is not actuated after the means for metering has metered ten pulses into each decade of the second register and to actuate the complementing means to recomplement the first register, recycle the metering means to restore the contents of the first register, recomplement the first register, activate the means for shifting to realign the first and second registers, reset the output counter and recycle the metering means when the overflow detector is actuated after metering ten pulses into each decade of the second register.

The invention, and further objects and advantages thereof can best be understood by reference to the following description and accompanying drawings in which.

Figure 5A:
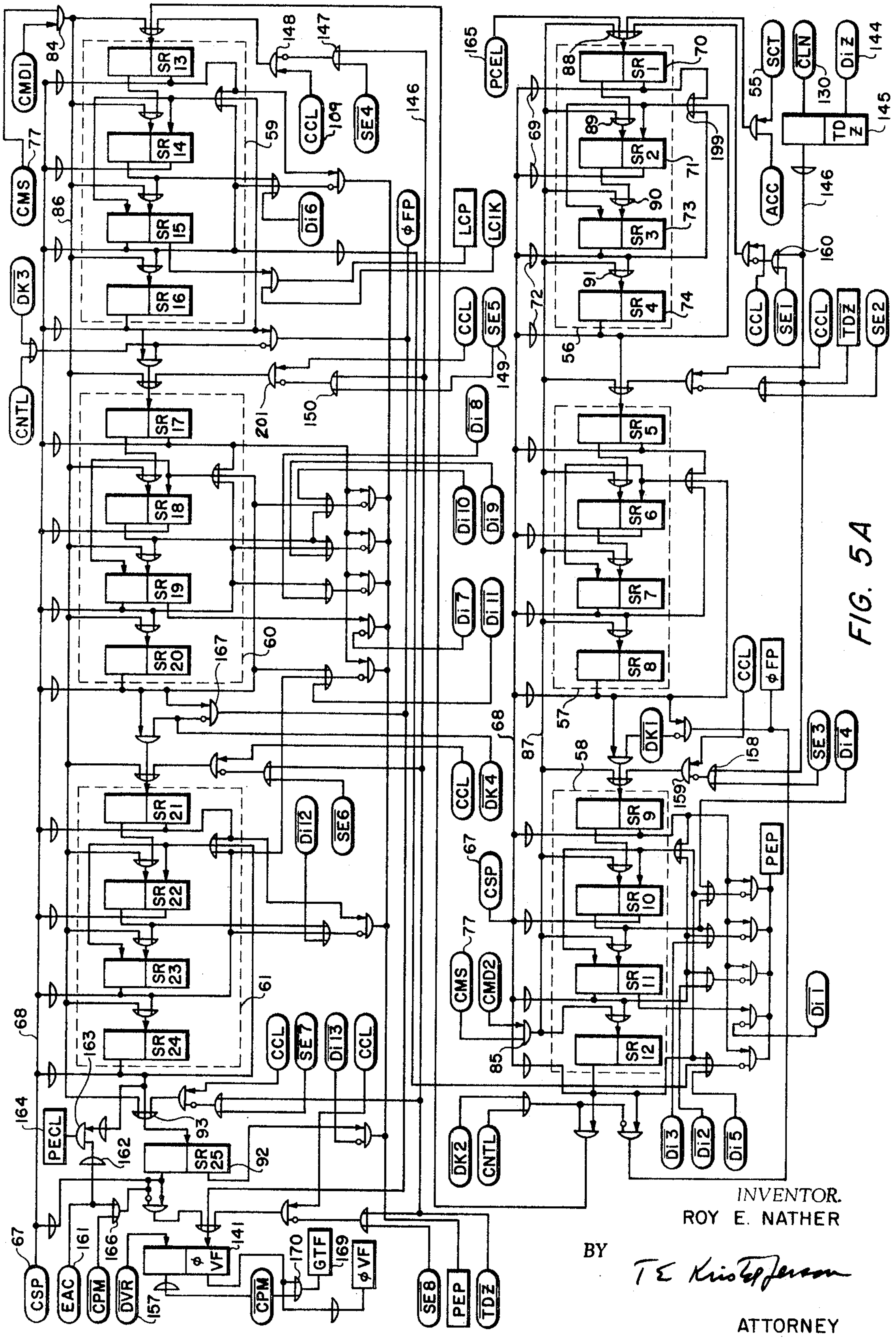
FIGS. 5A through 5G each represent a portion of a logic diagram of a preferred embodiment of the invention in greater detail as follows.
Figure 5B:
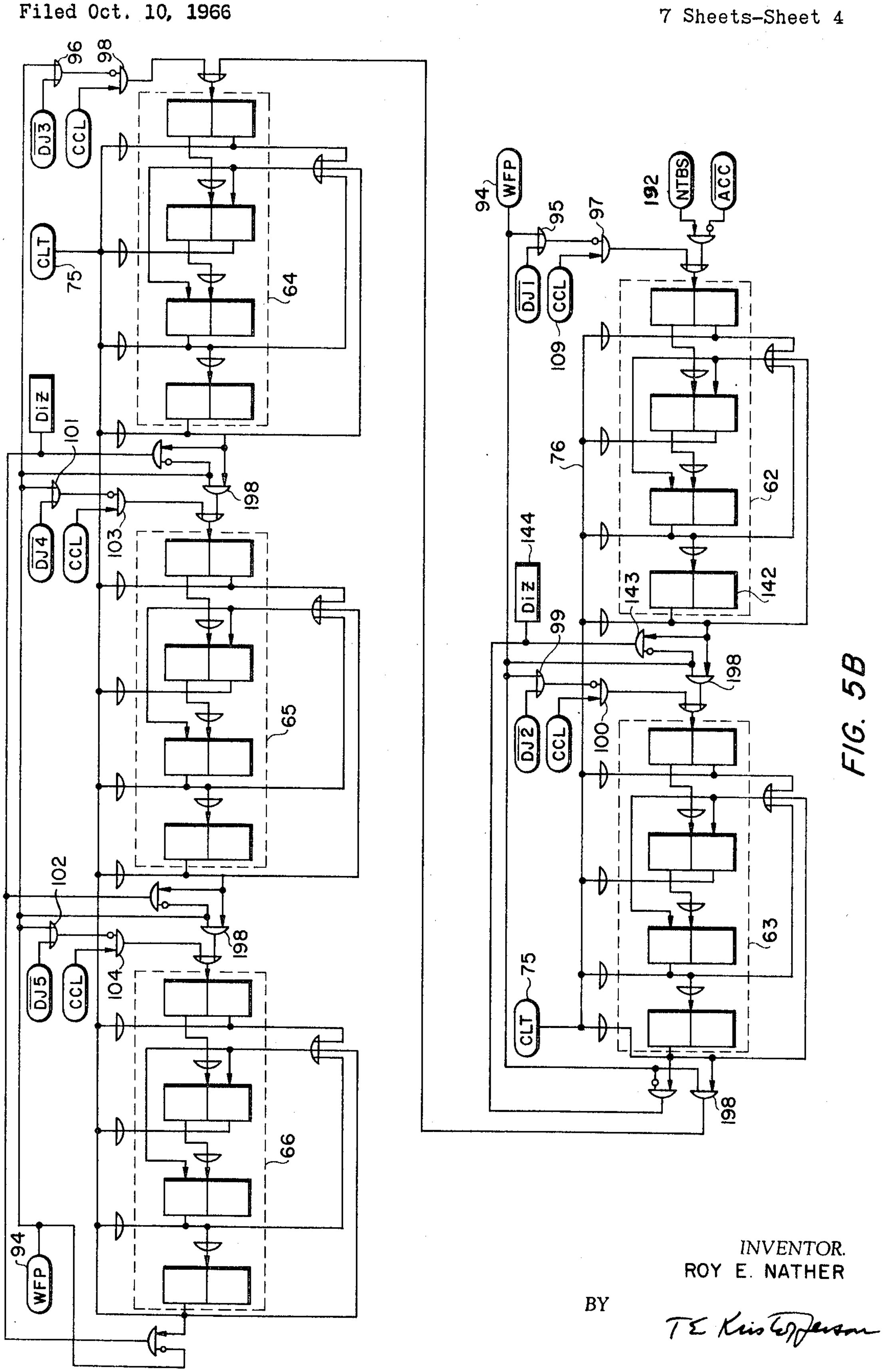
Figure 5C:
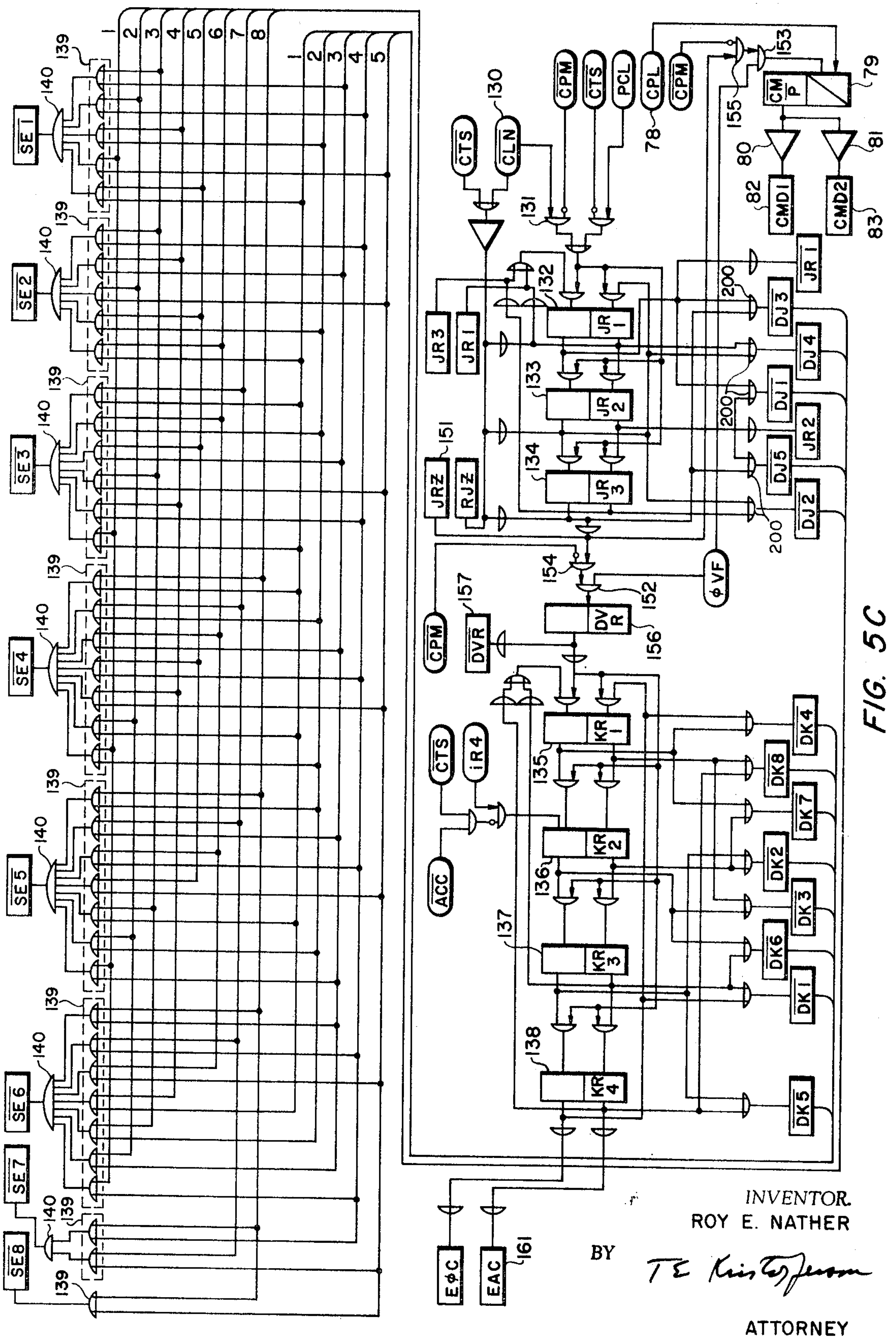
Figure 5D:
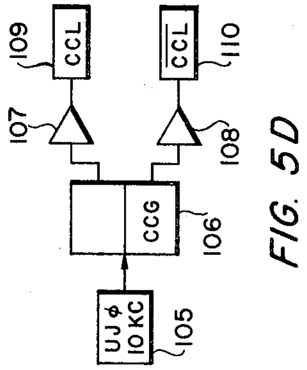
Figure 5F:
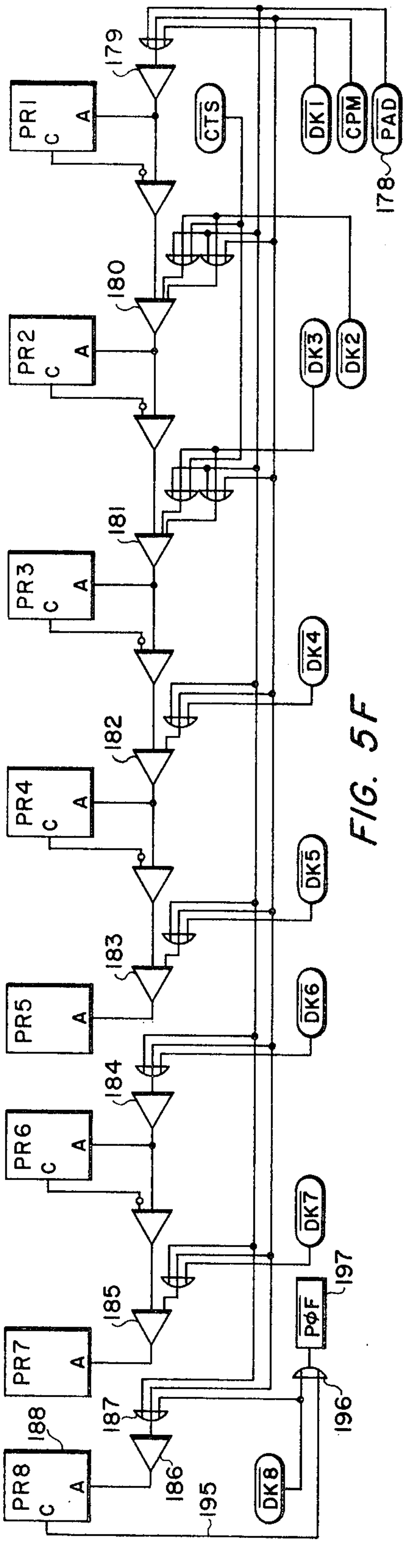
Figure 5G:
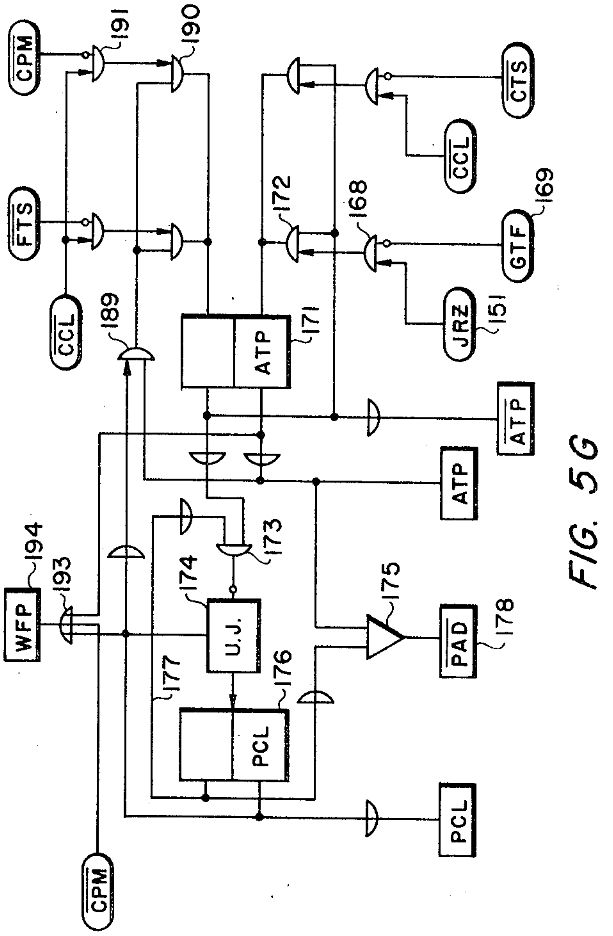
Figure 5E:
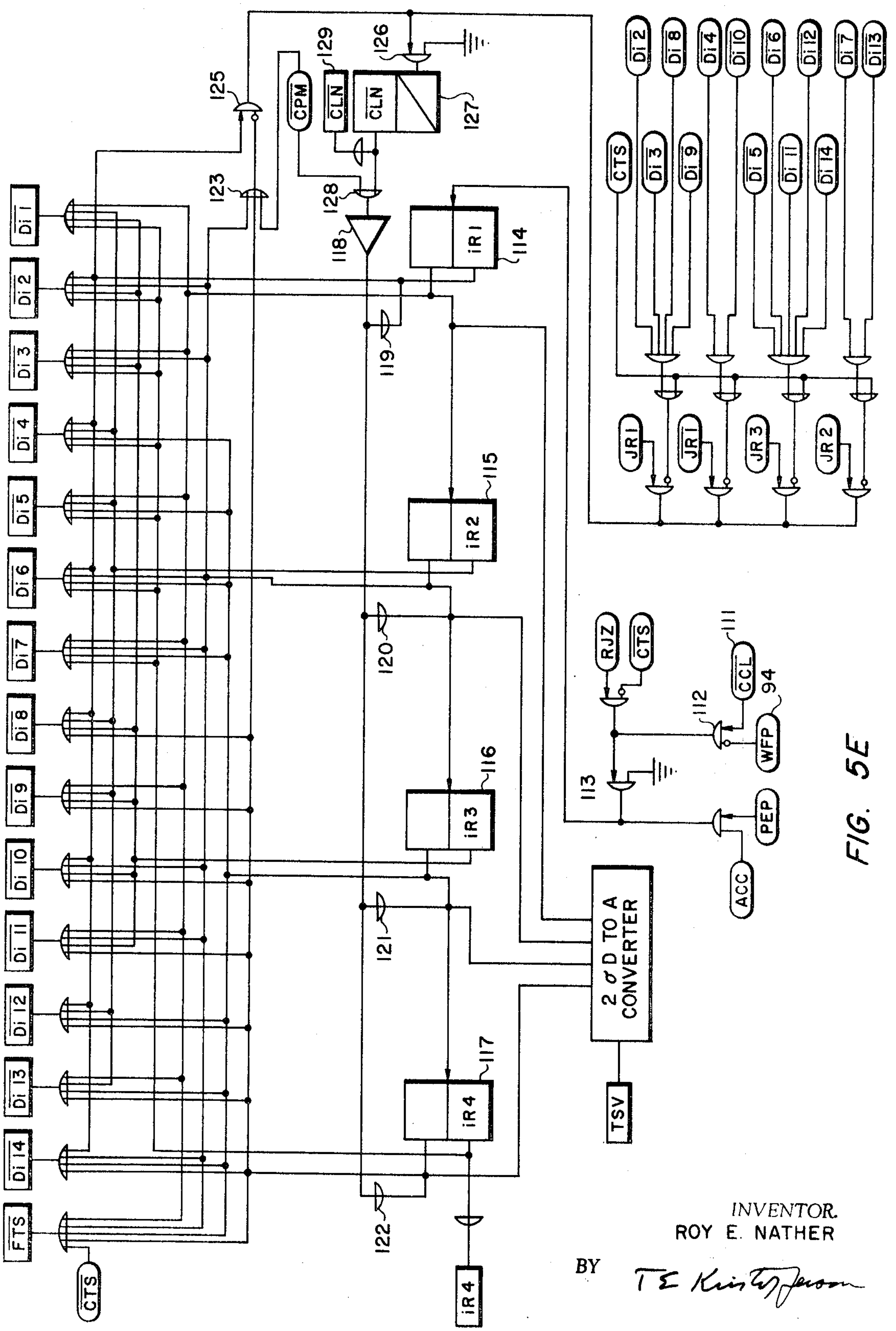

FIG. 5A: the scaler;
FIG. 5B: the timer:
FIG. 5C: the J counter, K counter, overflow switch, T select, S select, divide-restore flip-flop, and complementary amplifier;
FIG. 5D: clock pulse source:
FIG. 5E: the I counter;
FIG. 5F: output character register; and
FIG. 5G: output character register drive.

Figure 1:
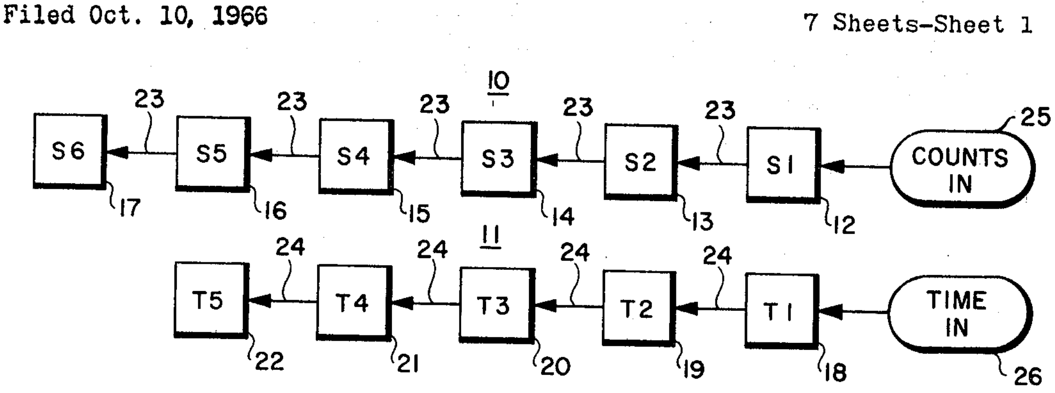
PRIOR ART FIG. 1
FIG. 1 is a block diagram of scaler and timer registers such as employed in radiation counting equipment of the prior art to accumulate radiation events and elapsed time.

Turning now to the drawings, FIG. 1 shows two basic registers 10 and 11 employed in prior art radiation counting equipment as well as in an instrument employing the subject invention; these may be an events register 10, hereinafter referred to as the S register or scaler, and a timer register 11, hereinafter referred to as the timer or T register. FIG. 1 shows a configuration used to accumulate data. The S register 10 contains a series of decades 12 through 17 and the T register 11, a series of decades 18 through 22. Each decade is capable of counting and storing up to nine individual events and providing a carry output following the tenth input event. The carry outputs in the scaler 10 are carried between decades on the carry lines 23 and the carry outputs in the timer 11 by the carry lines 24. The capacity of the scaler 10 and the timer 11 depends upon the application, the size shown being a typical one. For proper performance during the compute operation, in accordance with the invention, the timer must be smaller, by at least one digit, than the scaler. This is not unusual for this type of equipment and poses no limitations on the performance.

To facilitate the calculation in accordance with the invention, the decade operation mode for the decades 12 through 22 is chosen so that the complement of the number held in the decade can be simply obtained. For example, out of a number of coded decimal codes including; BCD 8421, 2421, 4221, Biquinary, 74210 and excess-3; the excess-3 code has the property that it is self-complementing; that is, if each of four bits representing the number is reversed, the 9's complement of the number is obtained. The excess-3 code is readily obtained by resetting the four bits in each decade prior to counting, such that the first two or low order bits contain a 1 and the others a zero. Any other self-complementing code might also be used in carrying out the invention, or any other code whose complementing can be performed by a simple process. As its name implies, this code is simply the familiar binary code, with 3 added to each digit. Thus, zero (in binary 0000) becomes zero plus 3, or 0011, in excess-3 code. The code is shown in Table I arranged to show its most useful property, called "self-complementing."

Characteristic of the excess-3 coded decimal code 6 of the 16 bit configurations are not used; in this case, these are symmetrically located above and below the 10 which are used. You will notice that this results in a neat symmetry between a number and its complement. It is so neat, in fact, that it is possible to obtain the 9's complement of any number by just reversing all of the bits which constitute the code for that number. For example, the number 3 is represented by the code 0110. If we just reverse all the bits we get 1001, the code for 6, which is the 9's complement of 3. (9−3=6). Since we will be using flip-flops to count and store numbers in the instrument, we can obtain the 9's complement of any number by the simple process of reversing the state of all the flip-flops at once. The 9's complement feature of the excess-3 code allows us to subtract one number from another by first complementing the number and then adding the second number.

TABLE I

| Excess-3 Code | Decimal number | 9's complement |
|---|---|---|
| 0000 | | |
| 0001 | | |
| 0010 | | |
| 0011 | 0 | 9 |
| 0100 | 1 | 8 |
| 0101 | 2 | 7 |
| 0110 | 3 | 6 |
| 0111 | 4 | 5 |
| 1000 | 5 | 4 |
| 1001 | 6 | 3 |
| 1010 | 7 | 2 |
| 1011 | 8 | 1 |
| 1100 | 9 | 0 |
| 1101 | | |
| 1110 | | |
| 1111 | | |

Figure 2:
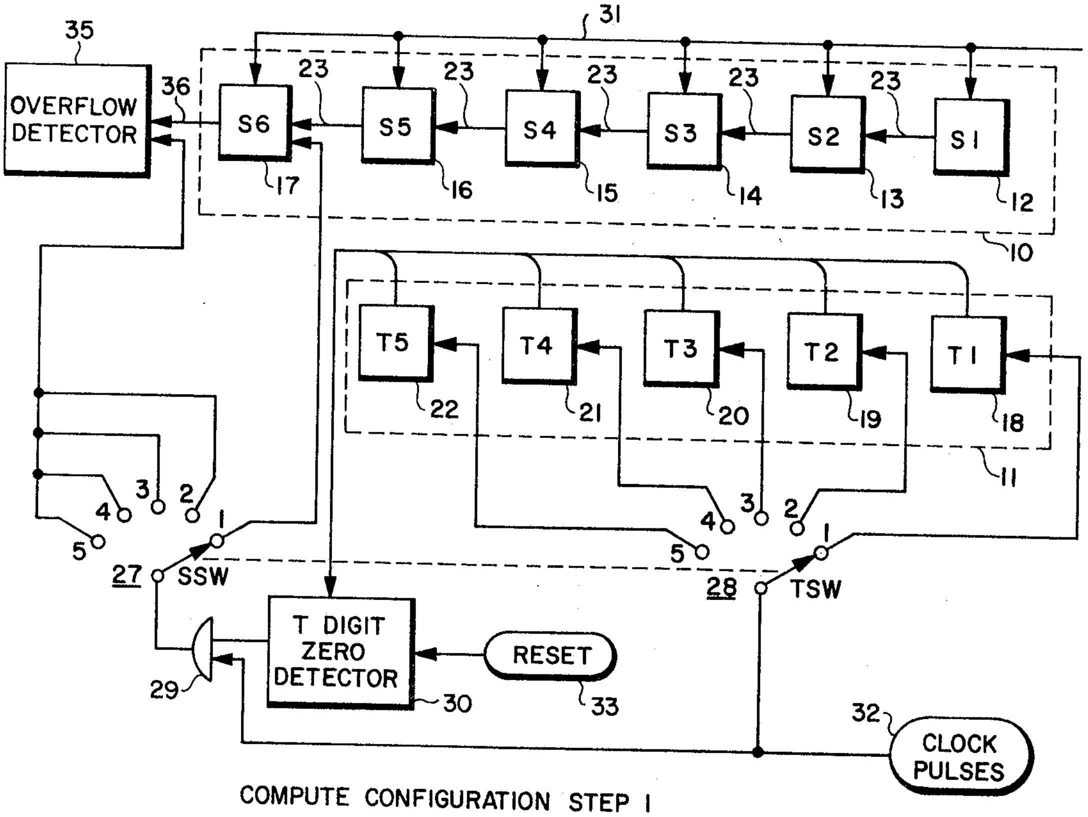
FIG. 2 is a diagram, partly in block and partly schematic, illustrating a compute configuration according to the instant invention.

Following the normal data accumulation in the system, such as illustrated in FIG. 1, where the decades 12 through 17 accumulate radiation events or counts in from the source 25 and the decades 18 through 22 accumulate the corresponding elapsed time from the time in source 26, it is desired to obtain the quotient or counts-per-unit time usually in the form of a character-serial output, high order digit first, for printing such as with a typewriter. FIG. 2 shows a configuration of the same scaler 10 and timer 11 having decades 12 through 22 (using the same numbers for like components in the various figures) arranged for the calculation to begin. Note that the carry lines 24 have been eliminated from the T register 11, which can be done simply by electronic pulse gating. The two switches 27 and 28, designated SSW and TSW respectively, provide selective interconnections and are shown as mechanical switches for simplicity of explanation. They would normally be electronic switches in an operating unit. The switches 27 and 28 are ganged and their purpose is to distribute clock pulses selectively to the T register 11 and, when gated by an "AND" gate 29 which is enabled in turn by a T digit zero detector 30, to the S register 10.

A complement line 31 is provided, connected to each of the decades 12 through 17 to pulse them in order to complement the contents of the S register 10. At the start of a calculation, the complement line 31 is pulse once, resulting in the number of counts stored in the scaler 10 being complemented or made negative. It can be seen that should a number now be added to the contents of the scaler 10 and then the scaler 10 recomplemented by a pulse on line 31, the result would be the difference between the original content of scaler 10 and the number added. This is effectively one method of subtraction.

Figure 3:
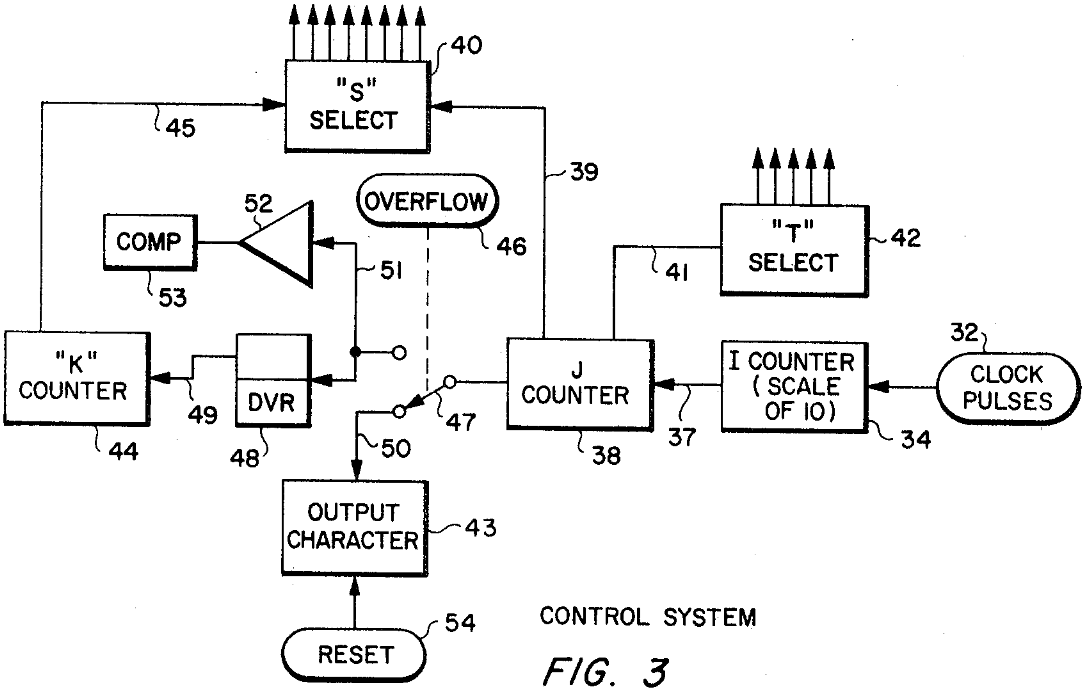
FIG. 3 is a diagram, partly in block and partly schematic, of a control system such as may be used in accordance with the teaching of the subject invention to control and modify the configuration of FIG. 2.

FIG. 3 shows a basic control for the system of the invention which, during the ensuing explanation, will be referred to in order to describe the divide process. To illustrate a specific example of the operation of the divide process, assume the scaler 10, illustrated in FIG. 2, and the timer 11 contain the following numbers:

S ---------------------------------------- 039629
T ---------------------------------------- 00321

At the start of the operation a pulse occurs on line 31, complementing the number in the scaler 10 such that the contents of the scaler 10 and timer 11 are now as follows:

S ---------------------------------------- 960370
T ---------------------------------------- 00321

A source of clock pulses 32 is now employed to add clock pulses through the switches 28 and 27, when in their position 1 as shown in FIG. 2, to the lower order decade 18 of the timer 11 and the high order decade 17 of the scaler 10, respectively. At the same time, a source of reset pulses 33 is employed to reset the T digit zero detector 30 such that none of the clock pulses from source 32 will enter the decade 17 until the selected timer decade 18 has been counted around to zero. This event is detected by the T digit zero detector 30, which in turn enables the "AND" gate 29 to pass the clock pulses from the source 32 through the switch 27 to decade 17. The decades 18–22 are connected to zero detector 30 in parallel, as with the illustrated cable connection.

Exactly ten clock pulses, as controlled by the I counter 34 in FIG. 3, are applied from the source 32 so that after the pulsing is completed the number in the decade 18 will be returned to its original value. Following the ninth such clock pulse, in the above example, the T digit zero detector 30 will note the passage of the decade 18 from 9 to 0 and will enable the gate 29 so that the tenth clock pulse from source 32 will enter both the decade 18 of timer 11 and the decade 17 of scaler 10. Since the decade 17 contains a 9, this pulse will cause it to carry to 0 and turn on an overflow detector 35 which is connected to the decade 17 over the carry line 36. This will indicate that the highest order digit of the quotient is a zero.

Returning to FIG. 3, the output of the I counter 34 is connected over the line 37 to the input of a J counter 38, which can be thought of as controlling the movable elements of the ganged switches SSW–27 and TSW–28 in FIG. 2 by means of the connection 39 to the S select 40 and the connection 41 to the T select 42. The S select 40 and the T select 42 contain the SSW switch 27 and the TSW switch 28, respectively, each with associated actuation circuitry. The J counter 38 then advances to the next position and the zero detector 30 is reset. In this position, ten clock pulses from the source 32, as controlled by I counter 34, are metered into the decade 19 since the switch TSW–28 is advanced to the second position. After the eighth pulse, the zero detector 30 is turned on and the last two pulses enter the overflow detector 35 through the SSW switch 27, which has been switched to its second position by the J counter 38. The detector 35 is already on from the previous step so there is no change in its condition.

It is now apparent that the configuration of the zero detector 30, scaler 10 and timer 11 results in a step-by-step addition of the contents of the timer 11 into selected digits or decades of the scaler 10 without any net change in the contents of the timer 11. In the aforedescribed step, the number 00321 will be added to the complement of the scaler 10 as if the numbers were aligned as follows:

```
xxxx960370
00321
----------
xxxx060370+overflow
```

where $x$ represents a nonexistant decade. After all five addition steps have been completed, the overflow detector 35 is examined and, if an overflow has occurred, the subtraction is unsuccessful; that is, it does not result in an increase in the quotient digit. However, if there is no overflow, the subtraction step is successful and a "one" is added into the appropriate quotient digit by means of an output character counter 43 in FIG. 3. Further, the subtraction operation is again attempted on the same selected S register decade 17. This is so because the K counter 44 does not actuate the S select 40 over the line 45 to cause it to advance the entry points from the fixed contacts on switch 27 to the next decades in scaler 10 since, in the absence of an overflow detected by the overflow detector 35, the overflow signal 46 does not actuate an overflow switch 47 to cause it to switch to its upper position, connecting the output of the J counter 38 to the input of the divide-restore flip-flop 48. The output of flip-flop 48 is connected, in turn, over the line 49 to the K counter 44 to cause it to advance the S select 40. Instead, when no overflow occurs, the switch 47 remains in its lower position to connect the output of the J counter 38 to the output character counter 43 over line 50, causing the counting of the quotient digit. This operation is continued until an unsuccessful subtraction occurs, resulting in an overflow and switching the switch 47 to its upper position to switch the S select 40, as previously described.

In arithmetic terms, the divisor digits in the decades 18–22 have been successively subtracted from those dividend digits in the decades 12–17 of the scaler 10 connected in the particular step as many times as possible without making the dividend go negative, or if complemented, to overflow. The number of times this subtraction operation is successful is counted and the result of this counting is the quotient digit.

As this operation is completed with the resulting overflow, it should be noted that it has gone one step too far; that is, the dividend is altered so that it has gone negative. This must be corrected so again the complement line 31 is pulsed, complementing the contents of the S register 10 and one more addition is performed to add back the last amount subtracted. This complementing takes place when the switch 47 of FIG. 3 is switched into its upper position, connecting the output of the J counter 38 not only to the divide-restore flip-flop 48, which controls the addition back of the last number subtracted, but over the line 51 and through the amplifier 52 to provide the complement output signal 53, which goes in turn to the complement line 31 of FIG. 2.

Following this addition step of adding back the contents of the timer 11 to the appropriate digits or decades of the scaler 10, the content of the scaler 10 is recomplemented by again pulsing the complement line 31, and the K counter 44 actuates the S select 40 to shift the entry points from the fixed contacts 1–5 of switch 27 to the S register 10 to prepare for the next decade operation. The foregoing steps are outlined as follows:

| | |
|---|---|
| At the end of the last step S | 060370 |
| Complement | xxxx939629 |
| Add timer | 00321xxxxx |
| Sum | 039629 |
| Recomplement | 960370 |

In algebraic terms, $A-B+B=A$, regardless of the values of A and B.

The scaler 10 has now been returned to its original content, complemented, and it has been determined that the high order digit in the quotient is zero. Under the control of the K counter 44, the decade 16 of the scaler 10 is now selected through the S select 40 as the entry point for the position 1 of the switch 27, and decade 17 is selected as the entry point for position 2 of switch 27, the remaining positions being again directed to the overflow detector 35 as illustrated in FIG. 2. It can be seen that this is equivalent to an alignment of the contents of the scaler 10 and the timer 11 for subtraction as follows:

| | |
|---|---|
| S | xxx960370 |
| T | 00321xxxx |

This subtraction, performed as the foregoing one, will still result in an overflow, this time after the second digit, adding the contents of the decades 17 and 19 and, accordingly, the second digit in the quotient is also a zero. Proceeding as previously, the divisor is restored to its original form and the registers 10 and 11 are realigned for the next subtraction by again switching the S select 40 to connect the first fixed position of the switch 27 to the decade 15, the second position to the decade 16, and the third position to the decade 17, with the remaining positions again connected to the overflow detector 35. This aligns the contents of the scalers 10 and 11 as follows:

| | |
|---|---|
| S | xx960370 |
| T | 00321xxx |

Again, the result is an overflow, indicating that the three high order digits in the quotient are zero. Realigning the contents of the scalers again, the fourth alignment is as follows:

| | |
|---|---|
| S | x960370 |
| T | 00321xx |
| Sum | 992470 |

Here, the subtraction is successful, since no overflow results. A "one" is added to the quotient digit over the line 50 into the output character counter 43, the divide-restore flip-flop 48 is not actuated and the subtraction is tried again as follows:

| | |
|---|---|
| S | x992470 |
| T | 00321xx |

This time an overflow results and the contents of the output character counter 43 are printed. The reset signal 54 to the output character counter 43 resets it to zero. The divide-restore flip-flop 48 restores the diminished divisor and the operation moves on to the next step as follows:

| | |
|---|---|
| S | 992470 |
| T | 00321x |
| Sum | 995680 |

This subtraction is successful, as is the next.

| | |
|---|---|
| S | 995680 |
| T | 00321x |
| Sum | 998890 |

The next subtraction will cause an overflow so this quotient digit is 2. The results of the two successful subtractions, having been accumulated in the output character register 43, are printed and the counter 43 is again reset by the signal 54.

Figure 4:
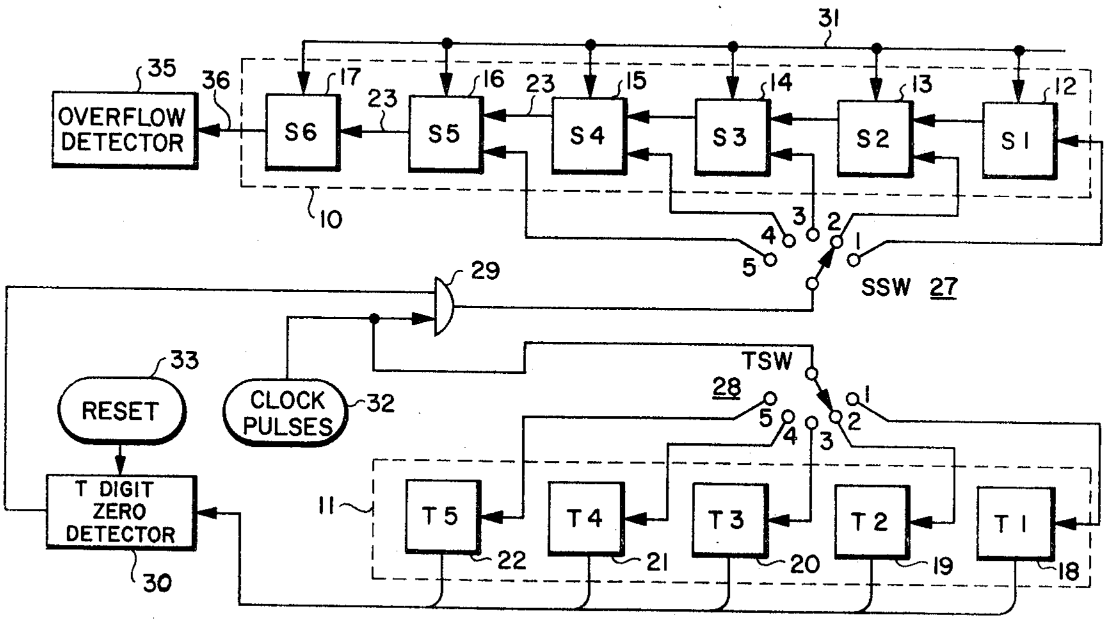
FIG. 4 is a diagram, partly in block and partly schematic, of a compute configuration of a subsequent step in a divide operation from that illustrated in FIG. 2.

Proceeding to the next or sixth step, the configuration is illustrated in FIG. 4. The switch 27 here has its first fixed position connected to the decade 12, the second position to the decade 13, the third position to the decade 14, its fourth position to the decade 15 and its fifth position to the decade 16. This results in the contents of the registers 10 and 11 being aligned as follows:

| | |
|---|---|
| S | 998890 |
| T | x00321 |

It can be seen that three successful subtractions can be made without overflow, resulting in a quotient to date of 000123. If an integer result is satisfactory, the process may be terminated. However, in most equipment additional significant figures are required. However, the process has run out of decades in the S register 10, having just finished operating on the low order decade 12, and in order to proceed to the next step it is necessary to have a decade of lower order than decade 12. The true value of the number remaining in the S register 10, since it is the remainder following the division, can never be equal to or greater than the number in the timer 11, which is the divisor. Since the largest number possible in the timer 11 is 99,999, it follows that the largest possible remainder in the S register 10 following the above fifth step is 099,998. Since the high order digit will always be zero at this step, the decade 17 can be disconnected by electronic gating from its position in FIG. 4 and moved to a position lower in order than the decade 12. At the same time, the carry signal over the line 23 from the decade 16 must be connected by suitable gating to the overflow detector 35. This configuration will allow us to proceed to the next step 7 with the contents of the registers 10 and 11 aligned as follows:

| | |
|---|---|
| S | D998539 |
| T | xx00321 |

where the D shows the position the decade 17 occupied before it was moved and the 9 in the last digit of the S register 10 is the complement of zero, the decade shown as reconnected for the next division step. Similarly, following step 7, the decade 16 can contain only a zero, or in complement form a 9, and it can be moved in the same manner to the next lower order position, and the carry 23 from the decade 15 connected to provide overflow to the overflow detector 35. This "end-around" relocation can proceed indefinitely but in practice is limited by the number of significant figures required in the printed results.

In the case where the output device requires that all of the characters be present before printing can occur, as in a printing register, the register itself can "count up" the individual quotient digits and no output character counter 43 is required. In this case, decoded output lines from the K counter 44 can provide gating controls to select the proper order digit in the output register as the operation proceeds. Similarly, the overflow from the K counter 44 signifies that the divide process is completed. The J counter 38 must have the same number of stable positions as there are decades in the timer 11. In our example it must be a scale of 5. The K counter 44 must have the same number of stable states as the number of output characters or significant figures required. As previously stated, the I counter 34 must be a scale of ten for the example described.

In the above described embodiment the calculation is destructive in the sense that the total number of events in the S register 10 is no longer available after the calculation. Therefore, calculation must be performed only after accumulation is completed and the total number of events has been printed out, if this information is desired. Although the described embodiment begins with the digit in decade 18 aligned with the digit in decade 17, it may often happen that it will be unlikely or impossible for the divisor or the number in the timer 11 to be so much smaller than the largest possible dividend or the number in the scaler 10 to make this alignment necessary. In other words, other considerations may dictate omitting the first step or two from the described scheme to avoid printing or computing high order quotient digits which will always be zero. Nothing precludes starting with an initial alignment of the decade 18 with the decade 15, for example. In case the first step or two is skipped, however, it will be wise to include a provision to detect a quotient overflow. The same provision can detect an attempt to divide by zero. If the output character counter 43 is made a scale of ten, or a provision is made to obtain a carry signal following the tenth input event, then an overflow signal from counter 43 will indicate an impossible condition: quotient overflow due to an attempt to divide by too small a number, or perhaps electronic malfunction, since proper operation precludes this overflow if all is well.

While the system described indicates that the T register accumulates counting time, it is not logically limited to that function. Clearly, any data accumulation is possible in the register 11. If two separate data accumulation channels are utilized in the instrument, one accumulating in S register 10 and the other in T register 11, then the output would be the ratio of the two accumulations and in this case the accumulation time must be provided by some other circuitry if it is necessary. Other examples of applications for the division, data reduction capability of the invention will be apparent to those skilled in the art.

The above example of division by successive subtractions includes as basic subcombinations, apparatus for performing addition in the event that the S register 10 is not complemented prior to adding the contents of the T register 11 therein, apparatus for subtraction when the register 10 is complemented and apparatus for division by complementing, successive subtraction and shifting.

Turning now to the detailed embodiment of FIGS. 5A–5G, the corresponding components of FIGS. 2 and 3 are illustrated as follows: The scaler 10 is illustrated in FIG. 5A, the timer 11 in FIG. 5B, the J counter 38, K counter 44, switch 47, T select 42, S select 40, divide-restore flip-flop 48, amplifier 52, and complementing output signal 53 in FIG. 5C, the source of clock pulses 32 in FIG. 5D, the I counter 34 in FIG. 5E, the output character counter 43 in FIG. 5F, and the drive for the output character counter 43 in FIG. 5G. Signals in ovals are inputs and those in rectangles are outputs. A line over letters designating a signal, stands for the "false" state. A circle on an input lead designates a "true" inhibit or false-enable. An arrow on an input lead designates an AC connection. Only as much of the circuits of FIGS. 5A–5G will be described as is necessary to understand the divide operation. These same circuits, together with other circuitry, also carry out many other functions in the operation of the over-all associated radiation counting equipment.

During the data accumulation mode, input pulses come into the scaler of FIG. 5A through the sample counts input SCT–55 and are stored in the decades 56–61. At the same time, a source of new time-base signals NTBS–192, which may be modified as described in a copending application of R. E. Nather et al., Ser. No. 561,907, filed June 30, 1966, entitled "Combined Data Accumulation Reduction System" and assigned to the assignee of the present invention, is fed into the timer of FIG. 5B which contains the five decades 62–66. As previously discussed, the decades 56–61 and 62–66 are coded in the excess-3 code. This is accomplished during the reset of the scaler and the timer prior to accumulating the data. The scaler reset signal occurs as the CSP input 67 on the lines 68. Each of the decades is similar to the decade 56 in which decoupling diodes 69 are connected from line 68 to the lower side of the two lower order flip-flops 70 and 71 to set a "one" into them, and decoupling diodes 72 are connected from line 68 to the upper side of the two higher order flip-flops 73 and 74 to set a zero into them. Similarly, the timer decades 62–66 are reset by the clear timer input CLT–75 over the clear lines 76. Each decade operates as a normal binary coded decimal counter except that the feed forward path is located differently because of the use of the excess-3 code. Pulses are passed through the decade in the normal fashion. A capacitively coupled true inhibited "OR" gate 199 will not allow any signal from the true side (bottom) of flip-flop 70 when it changes to a "one" to the true side of the flip-flop 71 and the false side (top) of flip-flop 73 unless both signals coming from the false sides of flip-flops 73 and 74 are zero. This is true for all conditions except during the receipt of the tenth pulse into the decade, when in the excess-3 code it contains a twelve or 1100. The tenth pulse will then set a "one" into the lower side of the flip-flop 70; there will be no carry but the output from the lower side of 70 will go through gate 199, since the tops of both flip-flops 73 and 74 are zero, to set a "one" into the lower side of flip-flop 71 and into the top of flip-flop 73, which will produce a carry to set a "one" into the top of flip-flop 74. The bottom of the flip-flops will then be zero in the excess-3 code or 0011.

After the data are accumulated in the registers of FIGS. 5A and 5B, they may be printed out if desired prior to the division step. Any other use of the contents of the scaler of FIG. 5A must be made prior to the division step since in that step the scaler contents are destroyed. When ready for the division step, the complement scaler input signal CMS–77 is "true." Next, in FIG. 5C, the "complement please" input CPL–78 goes "true" into the bottom side of the monostable multivibrator 79. This results in a "false" output signal from the top side of multivibrator 79, which goes through inverters 80 and 81 to the complement drivers CMD1–82 and CMD2–83, respectively. CMD1 and CMD2 then go to the other input of "AND" gates 84 and 85 in FIG. 5A, which had previously been enabled by the CMS–77 input. The output of the gates 84 and 85 is then "true," placing "true" signals on the lines 86 and 87, respectively. The lines 86 or 87 are connected to the inputs of each of the flip-flops in the decades 56–61 in a manner similar to the decade 56, where the line 87 is connected through "OR" gates 88–91 to the inputs of each of the flip-flops 70, 71, 73 and 74 to change its state. As previously discussed, when using the excess-3 code, the change of the states of each of the four flip-flops in a decade complements the contents of the decade.

A flip-flop 92 has its input connected from the output of the decade 61 through an "OR" gate 93. Flip-flop 92 is used to indicate when one million pulses have occurred. It also is complemented by the signal on line 86 going through the "OR" gate 93.

For the next step it is necessary to generate the "wait-for-printer" input WFP–94 in FIG. 5B. The input 94 goes through "OR" gates 95 and 96 to the false-enable connections on "AND" gates 97 and 98, respectively, such that the gates 97 and 98 are enabled when the input signal WFP–94 is false. This occurs when your are in this step and not printing and it is necessary to disable the computation process to enable the printer to keep up. The signal WFP–94 is also connected into the decade 63, through an "OR" gate 99 to a false-enable input on "AND" gate 100 an dthrough "OR" gates 101 and 102 to the false-enable connection on "AND" gates 103 and 104 to the decades 65 and 66, respectively. The source of the clock pulses 32, illustrated in FIGS. 2–4, is shown in more detail in FIG. 5D where a 10 kc. unijunction oscillator 105 feeds pulses into a flip-flop 106 to cause alternate pulses through the current drivers 107 and 108 to cause 5 kc. computer clock output pulses CCL–109 and computer clock not output pulses $\overline{\text{CCL}}$–110.

Turning to the I counter described in FIG. 5E, the output $\overline{\text{CCL}}$–110 appears as an input $\overline{\text{CCL}}$–111 to "AND" gate 112, the other input of which is false-enabled by WFP input 94. The pulses are then counted through the "AND" gate 113, the other side of which is enabled by grounding it, into the flip-flop 114. The flip-flop 114 is connected, in turn, through the flip-flops 115, 116 and 117 to provide a scale of ten counter. When the stages 114–117 were initially reset through the "NAND" gate 118, decoupling diode 119 set the flip-flop 114 to its "one" condition and decoupling diodes 120–122 set the flip-flops 115–117 to their zero state. After nine $\overline{\text{CCL}}$–111 pulses are counted into the I counter, the flip-flops 117 and 115 are "true" since the contents of the I counter is then ten. The false sides of flip-flops 115 and 117, together with "counts-per-minute-bar" ($\overline{\text{CPM}}$) which is false, appear at the output of the "OR" gate 123 as a false output, false-enabling "AND" gate 125. The next $\overline{\text{CCL}}$–111 advances flip-flop 114 to the "one" state, such that the output from its lower side to "AND" gate 125 provides a "true" output which goes through "AND" gate 126 to set the lower half of "clear-now-monostable-multivibrator" $\overline{\text{CLN}}$–127 true. When the top side of flip-flop 127 goes false and $\overline{\text{CPM}}$ is false, the two inputs to "OR" gate 128 both being false, cause the output of "NAND" gate 118 to be true, resetting the flip-flops 114–117 in the I counter.

When the monostable multivibrator 127 returns to its true state on the top side, its output signal $\overline{CLN}$–129 goes "true." This signal goes as the input signal $\overline{CLN}$–130 to the J counter of FIG. 5C, which passes through "AND" gate 131 since its other side is false-enabled by $\overline{CPM}$. The J counter is made up of the three flip-flops 132–134, which are connected as a shift register such that only one of the three flip-flops changes state each time an input pulse is received. Shift registers are used for simplicity of decoding through the "OR" gates 200. As five pulses are counted into the flip-flops 132, 133 and 134, false outputs will appear as decoded J counter positions on outputs $\overline{DJ1}$ through $\overline{DJ5}$, in that order.

The K counter, also illustrated in FIG. 5C, includes the four flip-flops 135–138, which are connected as a shift register in the same manner as the flip-flops 132–134 in the J counter. The manner of decoding the flip-flops 135–138 gives false decoded K counter position signals in the descending order $\overline{DK8}$ through $\overline{DK1}$. The $\overline{DJ1}$ through $\overline{DJ5}$ outputs represent the T select switch 28 of FIG. 2 for making the proper connections to the decades 62–66 in the timer register of FIG. 5B. The $\overline{DK8}$ through $\overline{DK1}$ outputs serve to sequence the output register of FIG. 5F. The two sets of signals are decoded through the "OR" gates 139 and "AND" gates 140 to provide the scaler entry position outputs ($\overline{SE1}$ through $\overline{SE8}$) to make the proper connections to the scaler decades 56–61, flip-flop 92 and overflow flip-flop 141 of FIG. 5A.

While the I counter of FIG. 5E is counting the ten $\overline{CCL}$ pulses from FIG. 5D, ten CCL output pulses 109 are going through the "OR" gate 97 in decade 62 of the timer in FIG. 5B, since $\overline{DJ1}$ and WFP–94 are false, false-enabling "AND" gate 97 through "OR" gate 95. When the decade 62 counts to zero, the overflow pulse from the output of the flip-flop 142 will go through "AND" gate 143, which is false-enabled by WFP–94, to provide a "digit-is-zero" output DIZ–144. The WFP–94 pulse being falso also serves to disable the "AND" gates 198 to disconnect the stages 62–66 in the timer and prevent passage of any carry pulses.

This pulse DIZ–144 will set "timer-digit-zero" flip-flop TDZ–145 in FIG. 5A. Since the line 146 from the top of flip-flop 145 $\overline{TDZ}$ is then false, and $\overline{SE4}$ is false, the two inputs to the "OR" gate 147 both being false, false-enables "AND" gate 148, and the remaining CCL–109 pulses are counted through "AND" gate 148 into the decade 59. After ten CCL–109 and $\overline{CCL}$–110 pulses, the I counter is reset as previously described and the $\overline{CLN}$–129 output appears as $\overline{CLN}$–130 input and advances the J counter. $\overline{CLN}$–130 also appears as an input to the top side of the TDZ flip-flop 145 in FIG. 5A to set the line 146 true. The contents of decade 62 have then been transferred into decade 59 and the J counter has been advanced so that the signal $\overline{DJ2}$ is false. This causes $\overline{SE5}$ to go false, which enters FIG. 5A as an input 149 through the "OR" gate 150 to false-enable "AND" gate 201 when line 146 again goes false, such that the excess CCL pulses, occurring after the DIZ output, will then be counted into the decade 60.

This process repeats itself until the contents of each of the timer decades 62–66 is counted into decades 59–61 and flip-flops 92 and 141, respectively. When we have gone from $\overline{DJ1}$ through $\overline{DJ5}$ and returned to $\overline{DJ1}$ in the J counter, the top side of flip-flop 134 goes true, providing a J-register-zero output pulse JRZ–151. In an overflow has occurred, the overflow signal $\phi$VF from flip-flop 141 in FIG. 5A enables "AND" gates 152 and 153 in FIG. 5C, and since $\overline{CPM}$ false-enables "AND" gates 154 and 155, the JRZ output 151 will advance the divide-restore flip-flop DVR–156 to the "one" state and trigger the monostable multivibrator 79 to generate the complement pulses 82 and 83, as previously described, which in turn will complement the decades 56–61 and flip-flop 92 in FIG. 5A. The cycle will then be repeated and the contents of the decades 62–66 will be added back into the scaler to compensate for the overflow.

After going through the cycle again, the same output appears on JRZ–151 and DVR flip-flop 156 is triggered again causing the output signal $\overline{DVR}$–157 to go true, and causing the number in the S register to be recomplemented. This signal goes as an input to the top side of the overflow flip-flop 141 in FIG. 5A, resetting it, and advances the K counter to $\overline{DK7}$. This has the effect through the S select of cause $\overline{SE3}$ to be false, such that the first entry point to the scaler is to decade 58 since the "OR" gate 158 false-enables "AND" gate 159 when $\overline{TDZ}$ is next false from flip-flop 145. The process then repeats itself through $\overline{DK5}$ when the entry point is in the decade 56 with the signal $\overline{SE1}$ being false through the "OR" gate 160. After this cycle, the output of the lower side of flip-flop 138 in the K counter of FIG. 5C goes true, generating an end-around carry output EAC–161. This enters as the EAC input 161 to FIG. 5A, which goes through the "OR" gate 162 to enable the "AND" gate 163 such that on the next cycle the overflow pulses from the decade 61 will go through the gate 163 to create an output PECL–164, which goes back as an input PECL–165 to "OR" gate 88. EAC–161 also goes through "OR" gate 166 to disable the connection from flip-flop 92 to the overflow flip-flop 141. Since $\overline{DK4}$ is then false, false-enabling "AND" gate 167, the carry from the decade 60 on the next cycle will go through the gate 167 to the overflow flip-flop 141. In the next succeeding steps, the decades 60, 59, etc., are successively end-around connected in the same manner.

In the event of a successful subtraction in any of the steps, no overflow signal occurs and the JRZ–151 output of the J counter does not go through the gates 152 or 153. Instead, it appears as an input JRZ–151 in FIG. 5G to "AND" gate 168, the second input of which is the "gone-too-far" output GTF–169 from the lower side of the flip-flop 141 of FIG. 5A. GTF–169 is false in the event of no overflow since both $\overline{CPM}$ and the lower half of the flip-flop 141 are false into the "OR" gate 170. Since the top side of "add-to-printer" flip-flop ATP–171 is true, in FIG. 5G, "AND" gate 172 is enabled and the JRZ–151 input passes through gates 168 and 172 to set the lower side of the flip-flop 171 true. The top side of flip-flop 171 then being false, goes to "AND" gate 173 whose output is then false, false-enabling the unijunction oscillator 174. The true output from the lower side of flip-flop 171 goes to one input of "NAND" gate 175, the other input of which is also true coming from the top side of P-clock flip-flop PCL–176. The true state of the top of flip-flop 176 is assured by the feedback 177. Printer-advance-bar output $\overline{PAD}$–178 is then false. It appears as an input $\overline{PAD}$–178 to FIG. 5F, which addresses all of the print register drive circuits 179–186 in parallel. However, the $\overline{DK1}$–$\overline{DK8}$ lines coming from the output of the K counter will assure that only one of these print register drives will be driven at a time. This is so because in connection with the driver 186, for instance, $\overline{DK8}$, $\overline{CPM}$ and $\overline{PAD}$ must all be false going into "OR" gate 187 to have a false output therefrom to create a true pulse out of the driver 186.

Returning to FIG. 5G, when the unijunction 174 which was previously enabled, fires, the output pulse changes the state of flip-flop 176 to "true" on its bottom side and $\overline{PAD}$ output 178 will then be forced true because of one false output from the top of flip-flop 176 into gate 175. This will de-energize the printer solenoid 188. The true signal from the bottom side of flip-flop 176 goes to enable one side of the "AND" gate 189, the other side of which receives a true signal from the lower half of the flip-flop 171. Gate 189, in turn, enables "AND" gate 190, which receives $\overline{CCL}$ inputs through gate 191 when it is false-enabled by $\overline{CPM}$. $\overline{CCL}$ then passes through "AND" gates 190 and 191 and resets ATP flip-flop 171 "true" in its top side. The next time unijunction 174 fires, the bottom side of flip-flop 176 goes false and all three inputs to "OR" gate 193 are then false, generating a false "wait-for-printer" output WFP–194 which permits the resumption of the division process.

In the event of an overflow from the high order stage of the printer, providing more than ten output pulses out of the gate 186, a feedback signal occurs from the carry pulse on line 195 which causes a false output from "OR" gate 196, since both the signal on line 195 and $\overline{DK8}$ are false, giving a false printer-overflow-bar output signal $\overline{P\phi F}$–197. This will advance the system out of the CPM mode and the contents of the register of FIG. 5F, which is now all zero, will be printed out, which will indicate that the counts-per-minute in the associated sample was one million or more per minute, which exceeds the capacity of the machine.

Since the principles of the invention have now been made clear, modifications which are particularly adapted for specific situations without departing from those principles will be apparent to those skilled in the art.

What is claimed is:

1. A computer for performing addition in the coded decimal system comprising:

a first coded decimal register having a plurality of decades and carry lines between decades;

a second coded decimal register having a plurality of decades and carry lines between decades, the contents of which is to be added to the contents of said first register as aligned without destroying the contents of said second register;

means for aligning the decades of said first and second registers in an order to be added;

means for disconnecting the carry lines of said second register;

a source of pulses;

means for metering ten of said pulses into each decade of said second register one decade at a time;

means for detecting when each of the decades of said second register passes through zero; and, means for also metering the remaining ones of said ten pulses after each decade in said second register passes through zero into the decade of said first register aligned therewith.

2. The computer of claim 1 for performing substration including:

means for complementing the contents of said first register prior to metering said pulses into said second register and recomplementing the contents of said first register after metering said pulses into said first and second registers.

3. The computer of claim 2 in which said decades each contain four bistable devices connected to store nine pulses and provide a carry on the tenth:

resetting means for resetting said decades in the excess-3 code by setting ones into each of the two low order ones of said devices and zeros into each of the two high order ones of said devices to facilitate obtaining the nines complement, and where said means for complementing and recomplementing is connected to change the state of each of said devices to obtain the nines complement of the number in the decade.

4. A computer for performing division by successive subtractions in the coded decimal system comprising:

a first coded decimal register having a plurality of decades with carry lines between decades;

a second coded decimal register having at least one less decade than said first register and carry lines between decades, the contents of which are to be successively subtracted from those of said first register as aligned without destroying the contents of said second register;

means for aligning the decades of said first and second registers with the lowest order decade of said second register under a high order decade of said first register;

means for disconnecting the carry lines of said second register;

means for complementing the contents of said first register to obtain the nines complement thereof;

a source of pulses;

means for metering ten of said pulses into each decade of said second register one decade at a time;

means for detecting when each of the decades of said second register passes through zero;

means for also metering the remaining ones of said ten pulses after each decade in said second register passes through zero into the aligned decade of said first register;

an overflow detector to detect carry pulses from the highest order decade of said first register to detect unsuccessful subtractions;

an output counter;

means for shifting the alignment of said second register to align said low order decade under a decade of said first register a given number of decades lower than said high order decade; and, control means connected to said overflow detector and said output counter to store a "one" in said output counter and to recycle said metering means when said overflow detector is not actuated after said means for metering has metered ten pulses into each decade of said second register; and to actuate said complementing means to recomplement said first register, recycle said metering means to restore the contents of said first register, actuate said complementing means to complement the contents of said first register, activate said means for shifting to realign said first and second register, reset said output counter and recycle said metering means when said overflow detector is actuated after said metering into each decade of said second register.

5. The computer of claim 4 in which said output counter has a plurality of decades, said overflow detector is connected to a high order decade of said output counter and said control means is connected to store a "one" in said high order decade of said output counter when said overflow detector is not actuated after said metering into each decade of said second register and to shift the connection to the decade in said output counter by said given number of decades when said overflow detector is actuated after said metering into each decade of said second register.

6. The computer of claim 4 in which said metering means is connected to meter pulses first into the low order decade of said second register and proceed upward through the high order decades.

7. The computer of claim 4 in which said metering means is connected to meter pulses first into the high order decade of said second register and proceed downward through the low order decades.

8. The computer of claim 4 in which said means for metering ten of said pulses into each decade includes a first counter having a scale of ten for counting said ten pulses and a second counter having a number of stable states equal to the number of positions in said second register for directing said pulses to designated decades and for providing a carry pulse which can be registered by said register in the event said overflow detector does not detect an overflow; and, said means for aligning and means for shifting the alignment includes a third counter having a number of stable states equal to the number of significant figures required in the result of the division process, which is decoded by connecting it together with said second counter through a decoding matrix for selecting the entry points for said pulses into said first register after zero detection by said zero detector to provide for said aligning and shifting.

9. The computer of claim 4, including means for successively disconnecting the carry line between the two highest order decades of said first register, connecting the carry line from the highest order decade of said first register to the input of the lowest order decade of said first register and connecting the carry line of the second highest order decade of said first register to said overflow detector, after an unsuccessful subtraction when the lowest order decade of said first and second registers are aligned in order to obtain additional significant figures.

References Cited

UNITED STATES PATENTS

| | | | |
|---|---|---|---|
| 2,924,383 | 2/1960 | Weiss | 235—159 |
| 3,385,960 | 5/1968 | Buu | 235—159 |

MALCOLM A. MORRISON, Primary Examiner

R. S. DILDINE, Jr, Assistant Examiner

U.S. Cl. X.R.

235—174